United States Patent
Hashimoto et al.

(10) Patent No.: US 7,397,214 B2
(45) Date of Patent: Jul. 8, 2008

(54) WHEELED MOVING ROBOT

(75) Inventors: Hideaki Hashimoto, Kanagawa-Ken (JP); Takafumi Sonoura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/554,889

(22) Filed: Oct. 31, 2006

(65) Prior Publication Data
US 2007/0132419 A1    Jun. 14, 2007

(30) Foreign Application Priority Data
Oct. 31, 2005    (JP)    ............ P2005-317615

(51) Int. Cl.
*B25J 5/00*    (2006.01)
(52) U.S. Cl. ............ 318/568.12; 318/568.16; 318/587; 180/934; 180/936; 700/245
(58) Field of Classification Search ............ 318/568.12, 318/568.16, 583, 587; 180/934, 936; 700/245
See application file for complete search history.

(56) References Cited

U.S. PATENT DOCUMENTS

| 5,100,138 | A | * | 3/1992 | Wilde | .............. 273/440.1 |
| 5,615,748 | A | * | 4/1997 | Lansberry | .............. 180/9.36 |
| 6,044,921 | A | * | 4/2000 | Lansberry | .............. 180/9.36 |
| 6,319,079 | B1 | * | 11/2001 | Cooper | .............. 440/12.5 |
| 2003/0060928 | A1 | * | 3/2003 | Abramson et al. | .............. 700/245 |

FOREIGN PATENT DOCUMENTS

JP    08-286759    11/1996

\* cited by examiner

*Primary Examiner*—Rina I Duda
(74) *Attorney, Agent, or Firm*—Oblon, Spivak, McClelland, Maier & Neustadt, P.C.

(57) ABSTRACT

A wheeled moving robot including a main body; wheels provided at least at opposite sides of the main body and configured to move the main body; an actuator configured to generate torque which rotates the wheels; a detector configured to detect whether the main body moves when the wheels rotates by the actuator; and a compensation unit configured to perform an auxiliary movement which pushes an auxiliary wheel in front or rear of the main body toward a floor based as a detection result of the detector.

3 Claims, 8 Drawing Sheets

WHEELED MOVING ROBOT

CROSS-REFERENCE TO RELATED APPLICATIONS

This application is based upon and claims the benefit of priority from the prior Japanese Patent Application No. 2005-317615, filed on Oct. 31, 2005; the entire contents of which are incorporated herein by reference.

BACKGROUND OF THE INVENTION

1. Field of the Invention

The present invention relates to a wheeled moving robot.

2. Description of the Related Art

A wheeled moving robot which drives wheels and moves freely in an operational environment may not be able to start to move from a still state when there are bumps on the floor surface and/or the static friction force between the wheels and the floor surface is large.

In fact, the static friction force between the wheels and the floor surface changes considerably in relation to the materials of the wheel rims and the materials of the floor surface. In order that the robot can move regardless of the materials, the robot must have a large sized actuator which generates large torque at a movement start and therefore has high electricity power consumption. However, since the wheeled moving robot is mainly driven by a battery, a small sized robot which has low electricity power consumption is desirable.

Moreover, as a method of compensating the static friction force of the actuator, there is proposed a method that compensates the static friction of a shaft at a rotation start by adding dither compensation torque instructions to the actuator so as to prevent a delay of the rotation start. (See, Japanese patent application (KOKAI) 8-286759) However, this method merely enhances a response performance of the actuator at the rotation start of the shaft insofar as the actuator can generate sufficient torque which exceeds the static friction force, such as with an industrial robot. However, the proposed method can not rotate the shaft when the torque generated by the actuator can not exceed the static friction force.

SUMMARY OF THE INVENTION

According to one aspect of the present invention, there is provided a wheeled moving robot apparatus which includes a main body; wheels provided at least at both sides of the main body and configured to move the main body; an actuator configured to generate torque which rotates the wheels; a detector configured to detect whether the main body moves when the wheels are rotated by the actuator; and a compensation unit configured to perform a auxiliary movement which pushes an auxiliary wheel in front or rear of the main body towards a floor according to a detection result of the detector.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
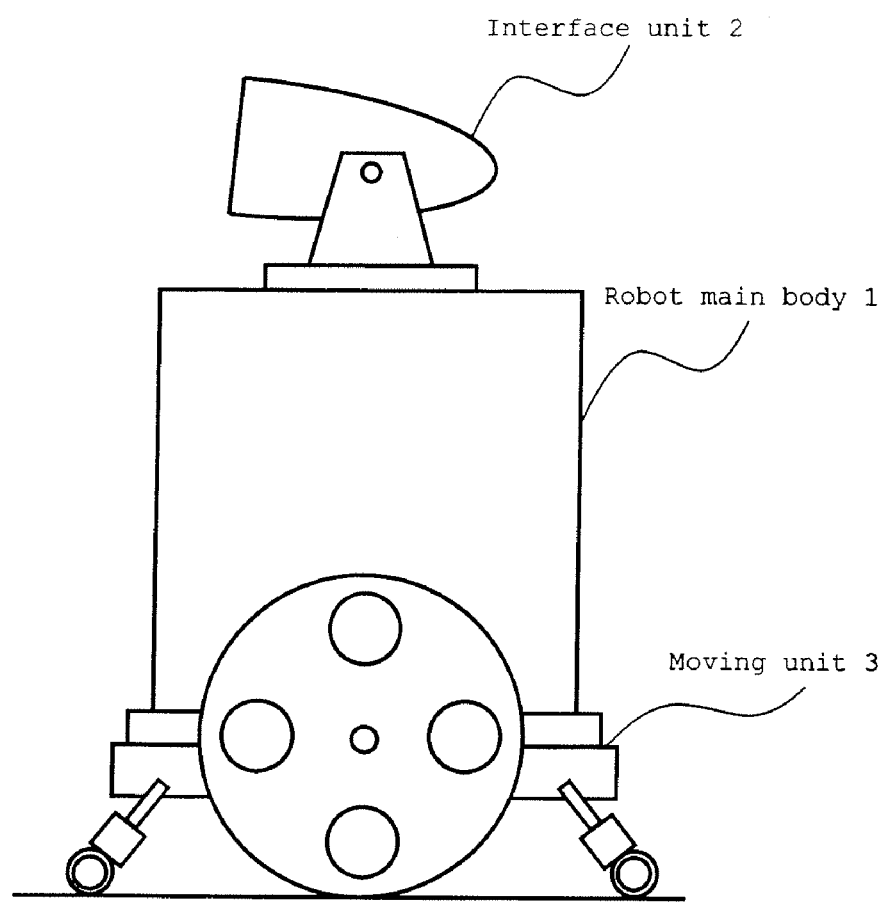
FIG. 1 is a block diagram of the wheeled moving robot.

Referring now to the drawings, wherein like reference numerals designate identical or corresponding parts throughout the several views, FIG. 1 is a block diagram of a wheeled moving robot according to an exemplary embodiment of the present invention. The wheeled moving robot includes a robot main body 1 having a battery, a controller, a speed sensor (not shown), a interface unit 2 installed the robot main body 1 having a liquid crystal display, a camera, a speech synthesizer, and a speech recognizer (not shown), and a moving unit 3 which freely moves the robot main body 1.

Figure 2:
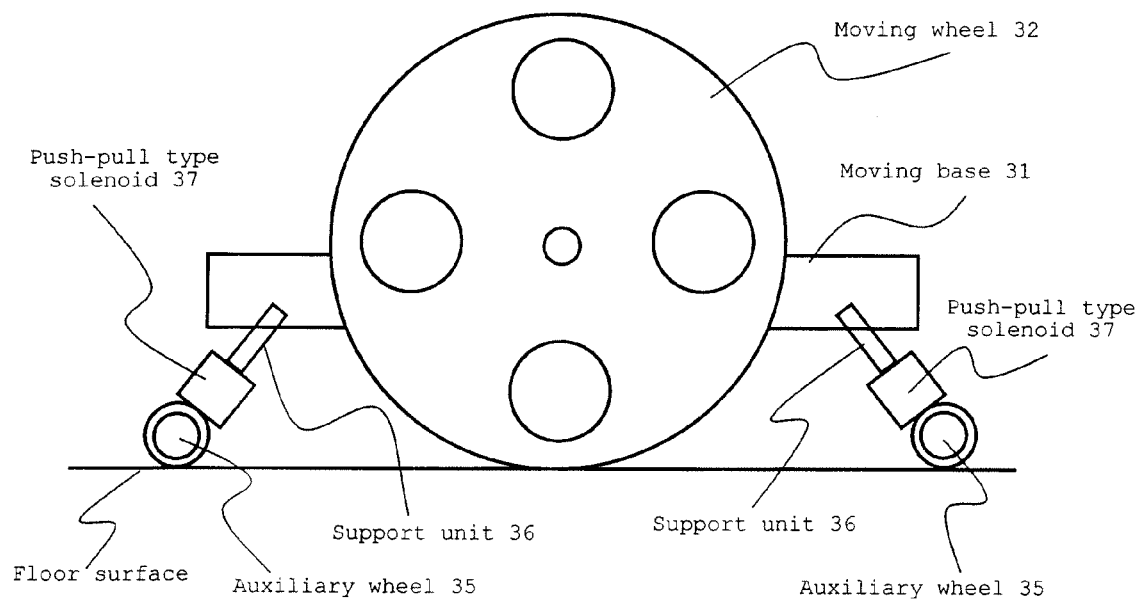
FIG. 2 is a side view showing a moving unit of the wheeled moving robot.
Figure 3:
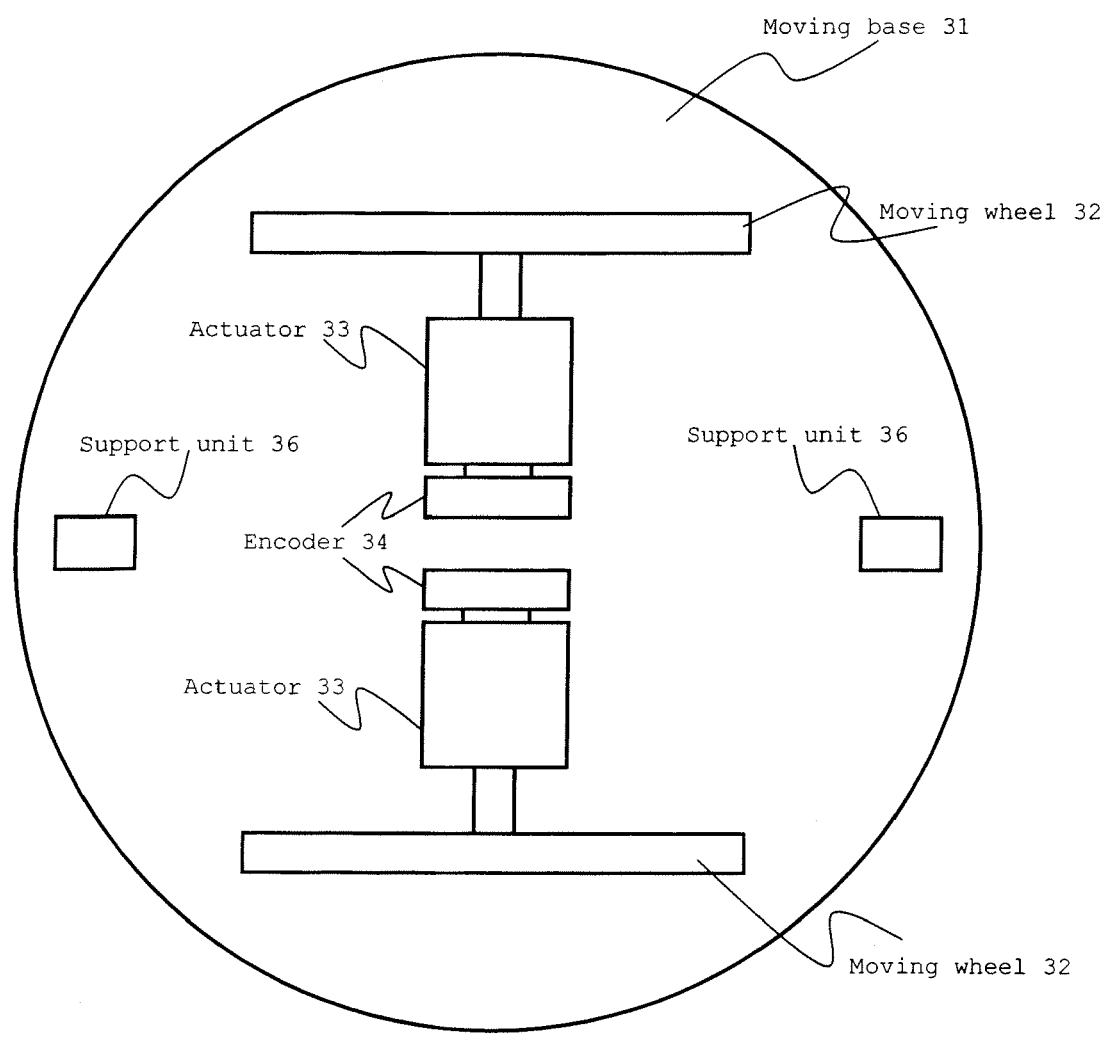
FIG. 3 is a top view showing a moving unit of the wheeled moving robot.

Next, the structure of the moving unit 3 is described in relation to FIGS. 2 and 3. As shown in FIG. 3, moving wheels 32 are mounted in parallel at both sides (upper and lower parts in FIG. 3) of a moving base 31.

Each moving wheel 32 is driven by an actuator 33 to which the movement wheel 32 is mounted. Moreover, each actuator 33 is provided with an encoder 34 which measures a rotation and a rotational speed of the moving wheel 32. Furthermore, as shown in FIG. 2, an auxiliary torque unit 4, which assists a driving torque for moving the wheeled moving robot, has auxiliary wheels 35 mounted front and rear of the robot main body 1, and push-pull type solenoids 37 which push the auxiliary wheels 35 against the floor surface. The moving base 31 is attached to the auxiliary wheel 35 and the push-pull type solenoid 37 at a setting angle $\theta$ through a support unit 36, respectively. Since each of the auxiliary torque units 4 is mounted front and rear of the moving wheels 32, the auxiliary torque units 4 also play a role which supports the robot main body 1 with the moving wheels 32 so that the wheeled moving robot can maintain a stable posture. In addition, each moving wheel 32 may be driven by an actuator 33.

Figure 4:
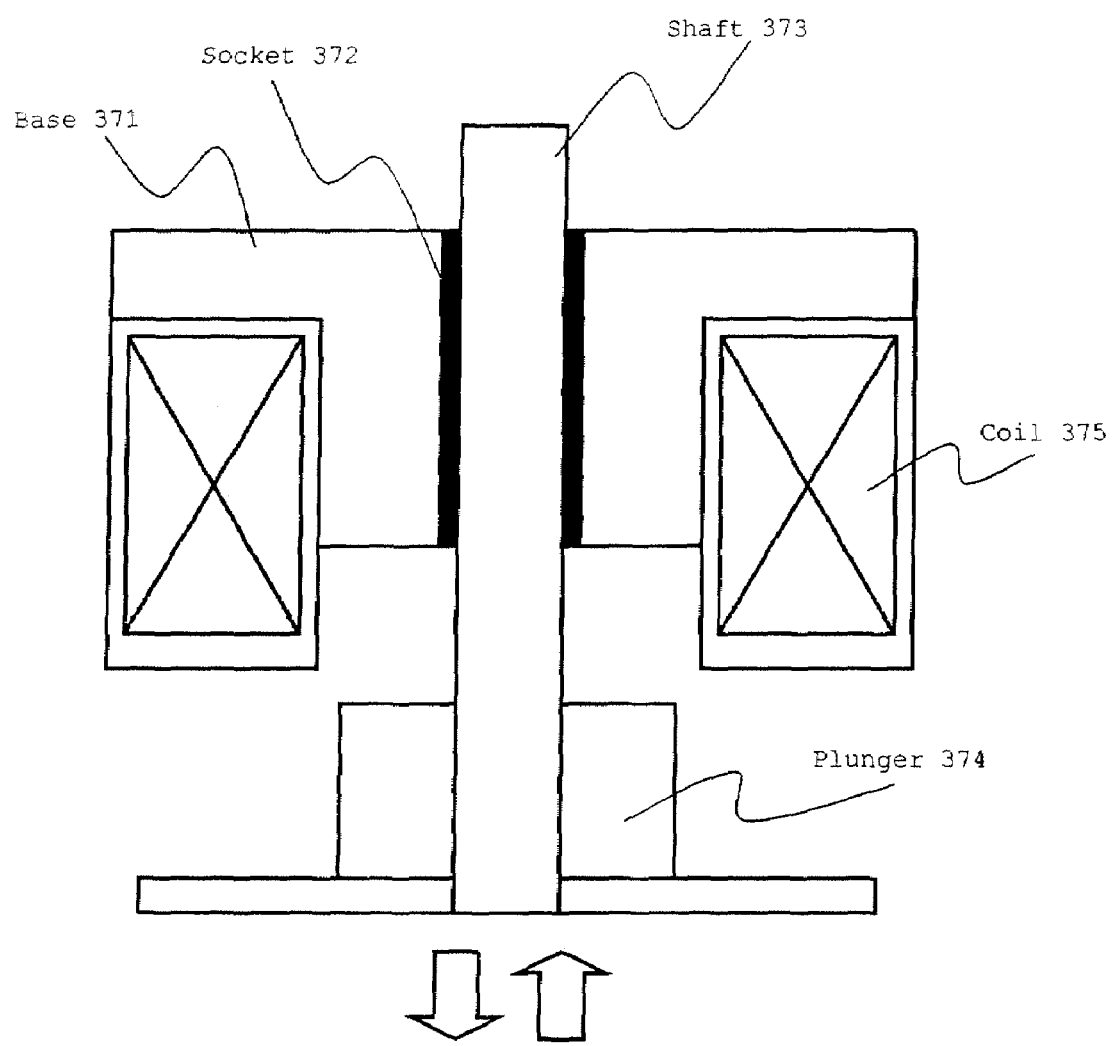
FIG. 4 is a block diagram of the push-pull type solenoid.

Next, the above push-pull type solenoid 37 is described in detail referring to FIG. 4. The push-pull type solenoid 37 has a base 371 which connects with the support unit 36, and a socket 372 which fits with a shaft 373 (what is extended from the support unit 36) and is mounted in the center of the base 371. Moreover, a plunger 374 is mounted with the shaft 373 on the opposite end of the base 371. The plunger 374 is connected to the auxiliary wheel 35, pushes the auxiliary wheel 35 toward the floor surface (lower direction in FIG. 4) by a push force Fsn when a coil 375 mounted with the base 371 around the shaft 373 is excited, and pulls back the auxiliary wheel 35 toward the opposite side of the floor surface (upper direction in FIG. 4) when the coil 375 is unexcited.

Here, the relation between the frictional force and torque generated by the actuator 33 is explained in regard to the situation where the stopped wheeled moving robot cannot move. In order to keep the explanation simple, in this embodiment, the friction coefficient is defined as the rolling-friction coefficient converted between the moving wheel 32 and the floor surface, and includes a coefficient of dynamic friction $\mu_m$ and a coefficient of static friction $\mu_s$. In addition, the coefficient of dynamic friction $\mu_m$ is proportional to speed.

Figure 5:
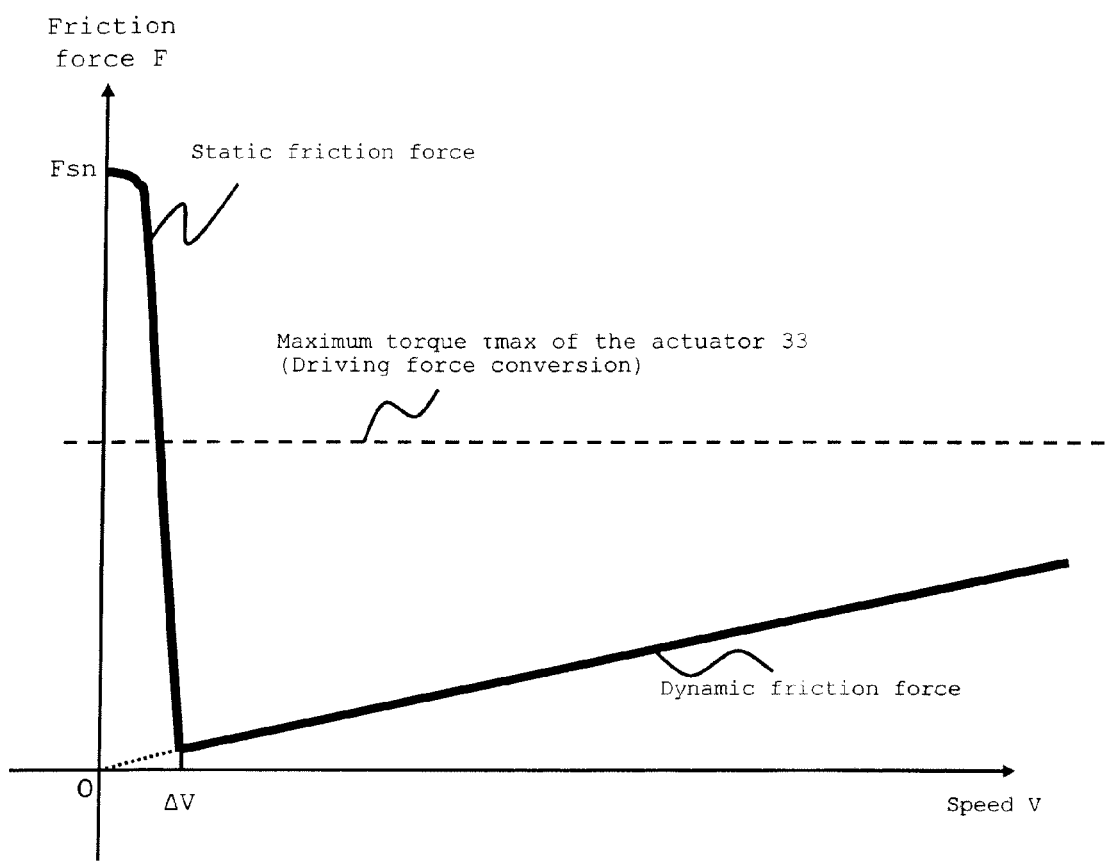
FIG. 5 is a graph showing a relation between the speed of the wheeled moving robot and the frictional force of the floor surface.

FIG. 5 shows a relation between a speed V of the wheeled moving robot and the frictional force between the moving wheel 32 and the floor surface. A horizontal axis shows the speed V of the robot main body 1, and a vertical axis shows the frictional force F(scalar) acting on the moving wheels 32 in a direction opposite to the moving direction. Moreover, a broken line shows a driving force of the moving direction converted to a maximum torque $\tau_{max}$ which the actuator 33 can generate.

A maximum static friction force Fs acts on the moving wheel 32 until the wheeled moving robot begins to move (in FIG. 5, V=0). The maximum static friction force Fs is determined by the static friction coefficient $\mu_s$ and a mass W of the wheeled moving robot, and is shown the following equation.

$$Fs = \mu_s \cdot Wg \quad (1),$$

where g is gravitational acceleration.

The friction force becomes a small value when the wheeled moving robot begins to move, and when the speed V of the wheeled moving robot reaches a speed $\Delta V$, it changes from the static friction force to the dynamic friction force.

A torque $\tau$ required to initiate rotation of the moving wheels 32 by exceeding the maximum static friction force Fs is shown by the following equation, since two of the moving wheels 32 are mounted with the moving base 31:

$$\tau = Fs \cdot r/2 = \mu_s \cdot Wg \cdot r/2 \quad (2),$$

where r is a radius of the moving wheel 32.

If the maximum torque $\tau_{max}$ is smaller than the torque $\tau$ required to initiate rotation of the moving wheels 32, the moving wheels 32 do not rotate. In this case, the maximum torque τmax is shown the following equation:

$$\tau = \mu_s \cdot Wg \cdot r/2 > \tau_{max} \quad (3),$$

The generated torque of the actuator 33 is insufficient by an amount $((\mu_s \cdot Wg \cdot r/2) - \tau_{max})$.

Usually, since the coefficient of static friction μs is dozens times or more than coefficient of dynamic friction $\mu_m$, the maximum static friction force Fs is very large as compared with the dynamic friction force. Therefore, the actuator 33 is enlarged if an insufficient torque amount is compensated for by means of the actuator 33.

So, in this embodiment, to compensate for the insufficient torque amount $((\mu_s \cdot Wg \cdot r/2) - \tau_{max})$, each the push-pull type solenoid 37 pushes the auxiliary wheel 35 against the floor surface by the push force Fsn.

Figure 6:
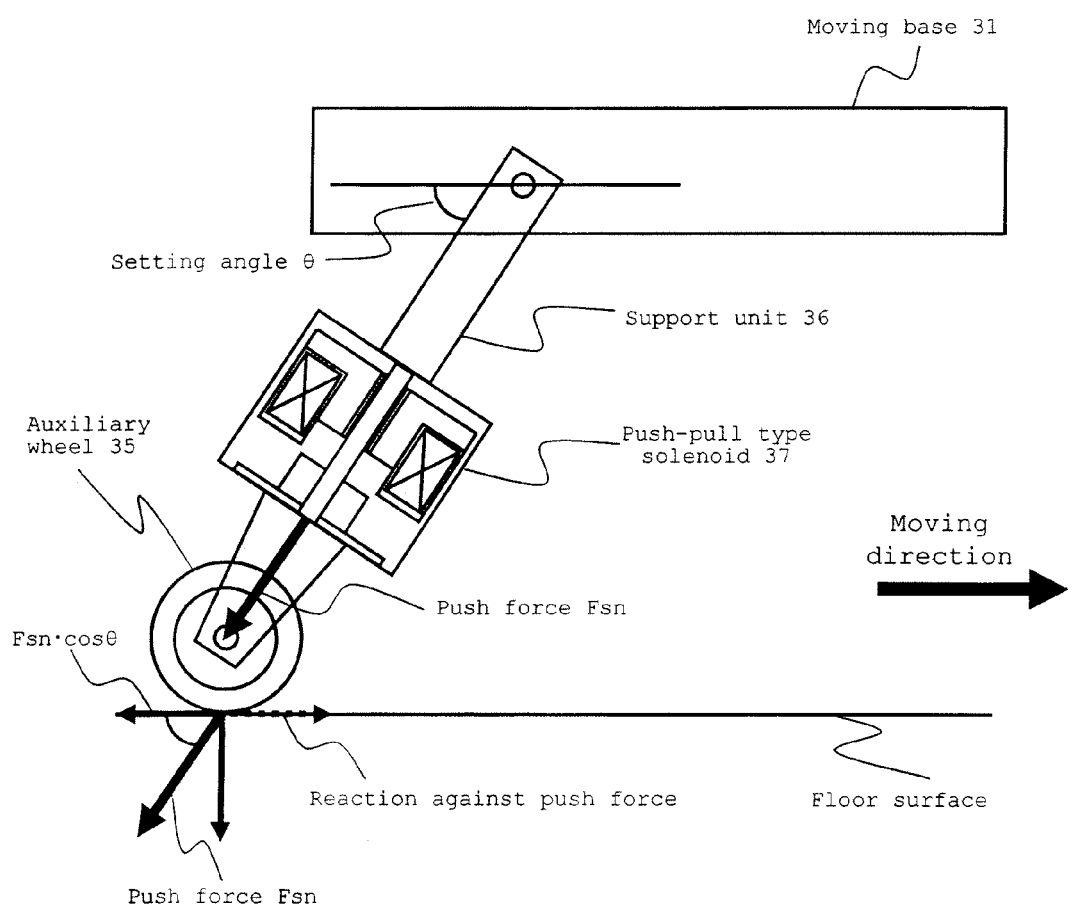
FIG. 6 is a side view showing a relation between the setting angle $\theta$ of the auxiliary wheel and the push force Fsn against the floor surface.

Next described are the push force Fsn required so that the auxiliary wheels 35 and the push-pull type solenoids 37 work as the auxiliary torque unit 4, and the setting angle θ, referring to FIG. 6. The rear auxiliary torque unit 4 works when the wheeled moving robot moves toward a front direction and the front auxiliary torque unit 4 works when the wheeled moving robot moves toward a rear direction.

When the wheeled moving robot moves toward a front direction, the push-pull type solenoid 37 of the rear side pushes the auxiliary wheel 35 of the rear side against the floor surface in a direction opposite to the moving direction by push force Fsn. At this point, a parallel component of the push force Fsn to the floor surface is Fsn·cos θ. The force Fsn·cos θ acts on the wheeled moving robot toward the moving direction as a reaction against the parallel component of the push force to the floor surface.

In order that the push-pull type solenoid 37 of the rear side compensates for the insufficient torque amount $((\mu_s \cdot Wg \cdot r/2) -$ τmax), the force of the moving direction acting on the wheeled moving robot needs to exceed the insufficient torque amount $((\mu_s \cdot Wg \cdot r/2) - \tau_{max})$.

That is, if the following inequality is met, the wheeled moving robot can move even if the generated torque of the actuator 33 is insufficient.

$$Fsn \cdot \cos\theta \geq (\mu_s \cdot Wg \cdot r/2) - \tau_{max} \quad (4)$$

The above mentioned equation (4) varies with the maximum torque of the actuator 33, the friction coefficients between the floor surface and the moving wheel 32, and the mass of the wheeled moving robot. Therefore, the push force Fsn and the setting angle θ are determined so as to fill the above mentioned equation in consideration of components of the wheeled moving robot and the environments in which the wheeled moving robot is used.

Figure 7:
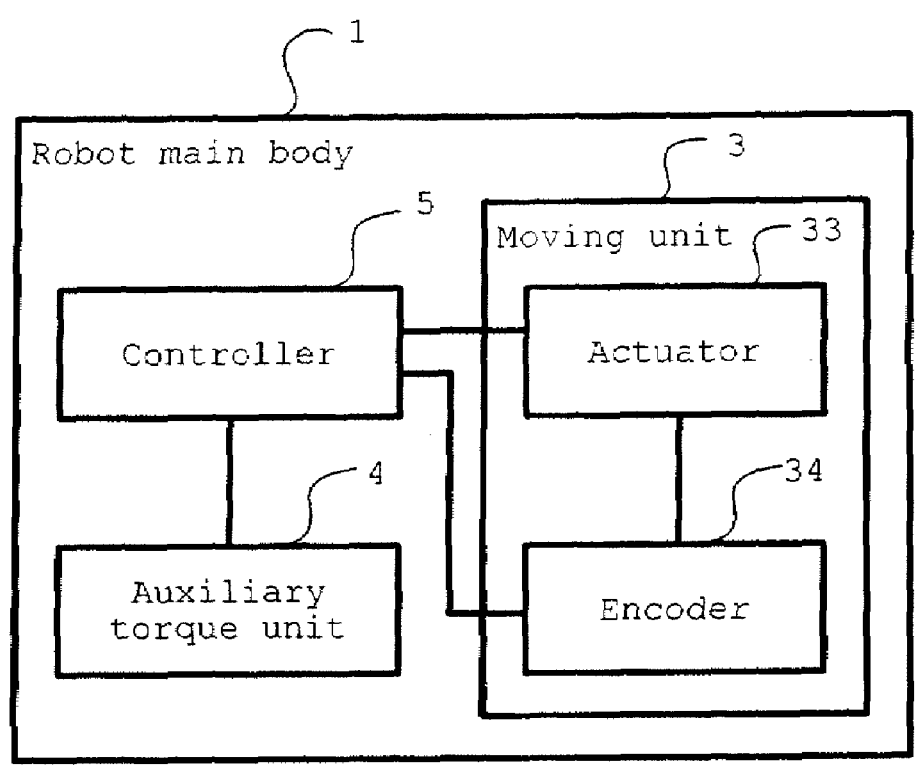
FIG. 7 is a block diagram showing functions of the wheeled moving robot.

Next, a motion control when moving a wheeled moving robot is explained in relation to FIG. 7, which is a block diagram showing functions of the wheeled moving robot. The robot main body 1 has a controller 5 in its interior. The controller 5 is coupled to the actuator 33 and the encoder 34 of each moving unit 3, and generates a moving-target control command to control the torque of the actuator 33. Furthermore, the controller 5 is coupled to the auxiliary torque unit 4, and generates a compensation torque control command based on information measured for the encoder 34, and controls the auxiliary torque unit 4.

Figure 8:
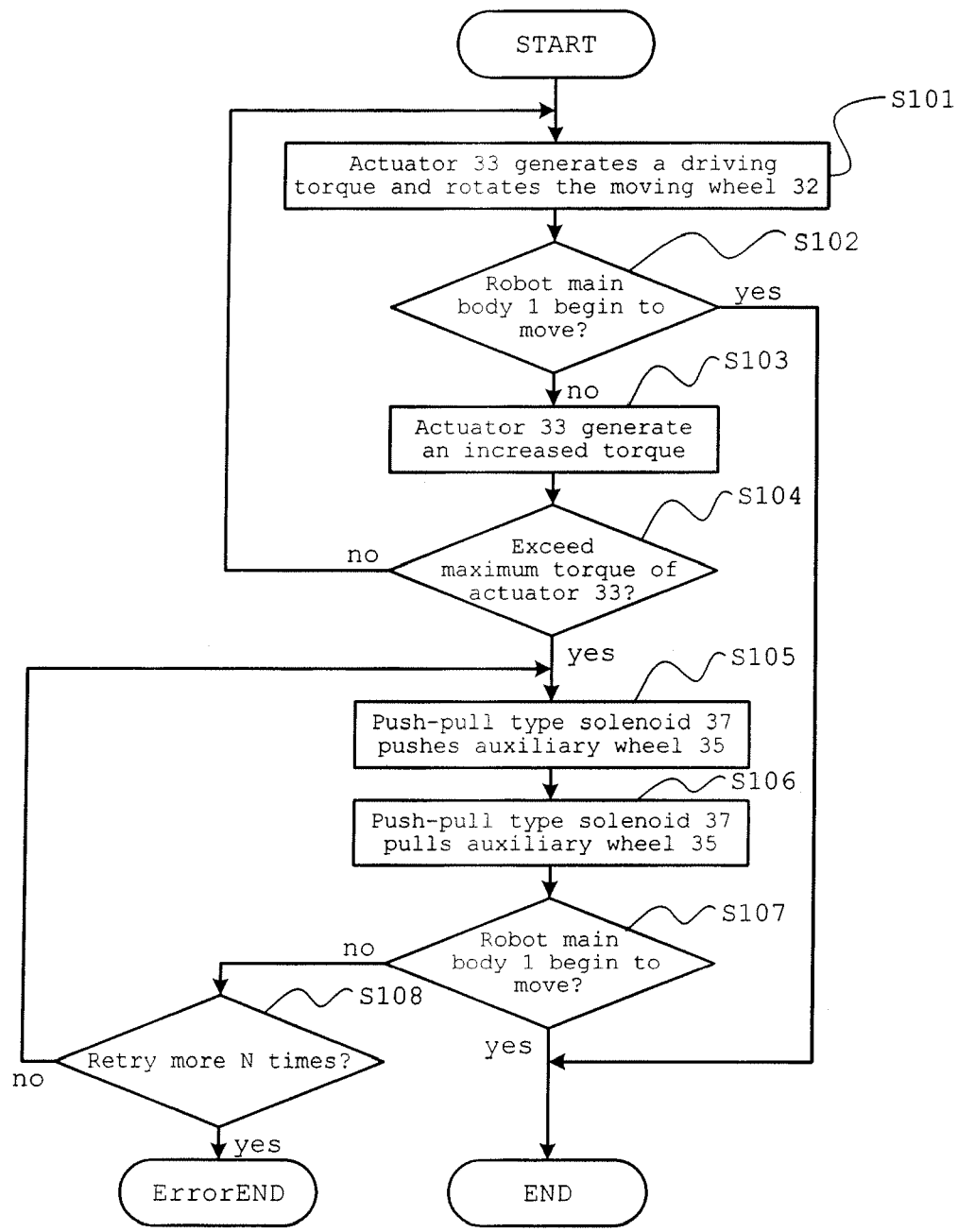
FIG. 8 is a flowchart showing a movement of the wheeled moving robot.

Next, the motion control when moving the wheeled moving robot is described referring to the flow chart of FIG. 8.

First, according to the moving-target control command which the controller 5 in the robot main body 1 generates, the actuator 33 generates a driving torque and rotates the moving wheel 32 (Step S101). Next, the controller 5 decides whether the robot main body 1 begin to move based on the rotation and the rotation speed of the moving wheel 32 which the encoder 34 measures (Step S102). The motion control ends if the robot main body 1 begins to move.

If it is determined in Step S102 that the robot main body 1 does not begin to move, the controller 5 signals the actuator 33 to generate an increased torque (Step S103), and the controller decides whether the increased torque exceeds the maximum torque (Step S104). When the torque of the actuator 33 does not exceed the maximum torque as determined in Step S104, the controller 5 returns to the Step S101 in order to rotate the moving wheel 32 with the increased torque.

On the other hand, when the torque of the actuator 33 exceeds the maximum torque by the decision of the Step S104, controller 5 decides that the maximum static friction force Fsn is larger than the maximum torque of the actuator 33, or that the wheeled moving robot can not begin to move due to a bump in the floor surface, and generates a compensation torque control command to the push-pull type solenoid 37 of the rear side. Thereby, the push-pull type solenoid 37 pushes the auxiliary wheel 35 against the floor surface (Step S105). At this time, the actuator 33 generates the maximum torque.

After pushing of the auxiliary wheel 35, the controller 5 generates a further compensation torque control command to the push-pull type solenoid 37 so that the push-pull type solenoid 37 pulls back, and the auxiliary wheel 35 returns to the position before pushing (Step S106). Next, the controller 5 decides whether the pushing action of Step S105 resulted in the robot main body 1 beginning to move (Step S107), and ends motion control if the robot main body 1 begins to move.

On the other hand, if the robot main body 1 does not begin to move as determined in Step S107, after checking the number of times of retrying the Step S105-Step S107, in a Step S108, when fewer than a predetermined number of retry times, the controller 5 returns to Step S105 and generates the compensation torque control command to the push-pull type solenoid 37, so that the push-pull type solenoid 37 pushes and pulls the auxiliary wheel 35. Thereby, the controller 5 retries motion control by pushing the auxiliary wheel 35 of the push-pull type solenoid 37 and the maximum torque of the actuator 33. The auxiliary motion controls (from the step S105 to the step S107) are retried only a predetermined number of times (N times). This is because a contact state between the floor surface and the auxiliary wheel 35 changes delicately by pushing the auxiliary wheel 35 in the Step S105 and the maximum static friction force Fs may change significantly.

In addition, when the controller 5 decides that the auxiliary motion controls have been retried N times or more in the Step S108, the controller 5 decides that the wheeled moving robot can not be moved by the actuator 33 and the push-pull type solenoid 37 and completes the motion controls by generating an error. When the number of times of retrying is less than N times, the controller 5 returns to the Step S105 and repeats the same motion controls.

In addition, the controller 5 can decide by the above mentioned encoder 34 and by using a speed sensor and an acceleration sensor in the robot main body 1 whether the robot main body 1 begins to move at the Step S102 and the Step S107. By using the speed sensor and the acceleration sensor, an error of deciding a motion start can be reduced when the moving wheel 32 idles at the bump.

Thus, according to this embodiment, when the wheeled moving robot can not begin to move even with the maximum torque of an actuator 33 being applied because of the influence of the static friction force or a bump in the floor surface, the wheeled moving robot can be forced to move without enlarging the actuator 33 by means of the auxiliary torque unit 4 by pushing the push-pull type solenoid 37 and pushing the auxiliary wheel 35 against the floor surface, so that the wheeled moving robot can be miniaturized. Moreover, a small wheeled moving robot which does not have unnecessary components can be realized by using the auxiliary wheel 35 not only as stable support of the robot main body 1 but as a part of the auxiliary torque unit 4. Furthermore, energy consumption of the wheeled moving robot can be reduced by exciting the push-pull type solenoid 37 only when pushing the auxiliary wheel 35 against the floor surface at beginning movement, and otherwise maintaining solenoid 37 unexcited when the wheeled moving robot stops and moves.

In addition, the present invention is not limited to the above mentioned embodiment and can be implemented by transforming components in ranges which do not deviate from the summary at an operation stage. Moreover, various inventions can be formed with proper combinations of various components employed in the above mentioned embodiment. For example, one or more components may be omitted from the components above described.

Accordingly, it should be understood that numerous modifications and variations of the present invention are possible in light of the above teachings. It is therefore to be understood that within the scope of the appended claims, the invention may be practiced otherwise than as specifically described herein.

What is claimed is:

1. A wheeled moving robot comprising:
   a main body;
   wheels provided at least at opposite sides of the main body and configured to move the main body;
   an actuator configured to generate torque which rotates the wheels;
   a detector configured to detect whether the main body moves when the wheels rotates by the actuator;
   a compensation unit configured to perform an auxiliary movement which pushes an auxiliary wheel in front or rear of the main body towards a floor based as a detection result of the detector, and
   a controller configured to control the torque of the actuator and the auxiliary movement of the compensation unit according to the detection result of the detector,
   wherein
   the detector is configured to detect whether the main body moves based on a detection of rotation or a rotational speed of the wheels,
   the controller is configured to increase the torque of the actuator until the detector detects a movement of the main body, and
   the controller is configured to perform the auxiliary movement of the compensation unit, when the controller increases the torque of the actuator to a maximum and the detector fails to detect a movement of the main body.

2. The robot according to claim 1, wherein the compensation unit comprises:
   an electromagnetic solenoid configured to push the auxiliary wheel towards the floor when excited, and return the auxiliary wheel when unexcited.

3. The robot according to claim 1, wherein:
   the controller is configured to perform the auxiliary movement two or more times, when the detector fails to detect a movement of the main body.

* * * * *